United States Patent [19]
Washisu

[11] Patent Number: 5,940,630
[45] Date of Patent: Aug. 17, 1999

[54] SYSTEM HAVING ANTIVIBRATION FACULTY

[75] Inventor: Koichi Washisu, Tokyo, Japan

[73] Assignee: Canon Kabushiki Kaisha, Tokyo, Japan

[21] Appl. No.: 08/357,155

[22] Filed: Dec. 15, 1994

Related U.S. Application Data

[63] Continuation of application No. 07/942,386, Sep. 9, 1992, abandoned.

[30] Foreign Application Priority Data

Sep. 10, 1991 [JP] Japan ................................. 3-257158

[51] Int. Cl.⁶ ................................................. G03B 17/00
[52] U.S. Cl. .............................................. 396/55; 396/52
[58] Field of Search ........................... 354/70, 202, 400, 354/412, 432, 430, 195.1, 195.12; 348/208; 396/52, 53, 54, 55

[56] References Cited

U.S. PATENT DOCUMENTS

| | | | |
|---|---|---|---|
| 4,586,029 | 4/1986 | Tamura et al. | 354/476 |
| 4,673,276 | 6/1987 | Yoshida et al. | 354/430 |
| 4,788,596 | 11/1988 | Kawakami et al. | 348/208 |
| 4,869,108 | 9/1989 | Washisu | 73/517 B |
| 4,965,619 | 10/1990 | Shikaumi et al. | 354/410 |
| 4,970,540 | 11/1990 | Vasey et al. | 354/202 |
| 5,020,369 | 6/1991 | Washisu et al. | 73/517 A |
| 5,053,875 | 10/1991 | Ishii et al. | 348/208 |
| 5,066,971 | 11/1991 | Kodaira | 354/465 |
| 5,084,724 | 1/1992 | Maeno | 354/430 |
| 5,117,246 | 5/1992 | Takahashi et al. | 354/202 |
| 5,146,263 | 9/1992 | Kataoka | 354/430 |
| 5,153,633 | 10/1992 | Otani | 354/430 |
| 5,155,520 | 10/1992 | Nagasaki et al. | 354/430 |
| 5,166,723 | 11/1992 | Yoshida et al. | 354/430 |
| 5,175,580 | 12/1992 | Shiomi | 354/410 |
| 5,218,442 | 6/1993 | Hamad et al. | 354/478 |
| 5,220,375 | 6/1993 | Ishida et al. | 354/419 |
| 5,231,445 | 7/1993 | Onuki et al. | 354/410 |
| 5,245,278 | 9/1993 | Washisu | 354/410 |
| 5,266,981 | 11/1993 | Hamada et al. | 354/400 |
| 5,291,300 | 3/1994 | Ueda | 354/410 |
| 5,323,204 | 6/1994 | Wheeler et al. | 354/412 |

FOREIGN PATENT DOCUMENTS

| | | | |
|---|---|---|---|
| 5455429 | 12/1979 | Japan | 354/430 |
| 2-126251 | 5/1990 | Japan . | |

*Primary Examiner*—Safet Metjahic
*Assistant Examiner*—Michael Dalakis
*Attorney, Agent, or Firm*—Fitzpatrick, Cella, Harper & Scinto

[57] ABSTRACT

A system having an antivibration faculty includes a vibration detector for detecting a vibration, and an image stabilizer for performing image stabilization according to an output from the vibration detector. The vibration detector and the image stabilizer together constitute an antivibration system. A controller is provided for changing an operation state of the antivibration system in accordance with an operation state of a system other than the antivibration system.

29 Claims, 13 Drawing Sheets

SYSTEM HAVING ANTIVIBRATION FACULTY

This application is a continuation of application Ser. No. 07/942,386 filed Sep. 9, 1992, now abandoned.

BACKGROUND OF THE INVENTION

1. Field of the Invention

The present invention relates to a system having an antivibration faculty, comprising a correction optical means for deflecting a light beam by moving an optical member, a vibration detection means for detecting a vibration, and a control means for controlling a driving operation of the correction optical means according to the output from the vibration detection means.

2. Related Background Art

The prior art to which the present invention is to be applied will be described below.

In recent cameras, since all the operations necessary for performing a photographing operation, such as an exposure determination, focusing, and the like are automatically performed, even a person who is not accustomed to camera operations rarely makes an unsuccessful photographing operation. However, it is difficult to automatically prevent an unsuccessful photographing operation caused by camera vibration.

Thus, in recent years, extensive studies have been made to develop cameras, which can prevent an unsuccessful photographing operation caused by a camera vibration. In particular, cameras, which can prevent an unsuccessful photographing operation caused by hand vibration of a photographer, have been developed and studied.

The hand vibration of a camera during a photographing operation normally has a frequency of 1 Hz to 12 Hz. As the basic principle for allowing the taking a photograph free from image blur even when hand vibration occurs at the release timing of a shutter, the vibration of the camera caused by hand vibration is detected, and a correction lens can be deviated according to the detection value. Therefore, in order to achieve the above-mentioned object (to allow the taking of a photograph free from an image blur even when a camera vibration occurs), first, the vibration of the camera must be accurately detected, and second, the change in the optical axis caused by the hand vibration must be corrected.

The vibration (camera vibration) can be detected, in principle, by mounting a vibration sensor for detecting an angular acceleration, an angular speed, an angular deviation, or the like, and a camera vibration detection means for electrically or mechanically integrating an output signal from the sensor, and outputting an angular deviation signal in the camera. A correction optical mechanism for decentering the photographing optical axis based on the detection information is driven, thus performing image blur suppression.

The outline of an image blur suppression system (antivibration system) using an angular deviation detection device will be described below with reference to FIG. 5.

FIG. 5 shows a system for suppressing image blur caused by a camera vertical vibration 61p and a camera horizontal vibration 61y in the directions of arrows 61 in FIG. 5.

The system shown in FIG. 5 includes a lens barrel 62, and angular deviation detection devices 63p and 63y for respectively detecting camera vertical and horizontal angular deviations. The detection devices 63p and 63y respectively detect angular deviation in detection directions 64p and 64y.

The system also includes calculation circuits 65p and 65y for calculating signals from the angular deviation detection devices 63p and 63y to convert them into correction optical system driving signals. A correction optical mechanism 66 (including driving sections 67p and 67y and correction optical position detection sensors 68p and 68y) is driven by the converted signals, thus assuring stability on an image plane 69.

FIGS. 6 to 10 show an arrangement of an angular deviation detection device as a vibration sensor. The angular deviation detection device will be described below with reference to FIGS. 6 to 10.

In FIGS. 6 to 9, parts constituting the detection device are attached on a base plate 51. An outer cylinder 52 has a chamber in which a float 53 and a liquid 54 (to be described below) are sealed. The float 53 is held by a float holder 55 (to be described below) to be rotatable about a shaft 53a, and a slit-like reflection surface is formed on a projection 53b. The float 53 is constituted by a material comprising a permanent magnet, and is magnetized in the direction of the shaft 53a. The float 53 is arranged to keep rotational balance about the shaft 53a and buoyancy balance.

The float holder 55 holds the float 53 via pivot bearings 56, and is fixed to the outer cylinder 52. A U-shaped yoke 57 is attached to the base plate 51, and forms a closed magnetic circuit together with the float 53. A coil 514 is arranged between the float 53 and the yoke 57, and has a stationary relationship with the outer cylinder 52. A light-emitting element (iRED) 58 emits light upon energization, and is attached to the base plate 51. A light-receiving element (PSD) 59 changes its output depending on the light-receiving position. The iRED 58 and the PSD 59 constitute an optical angular deviation detection means for transmitting light via the projection (reflection surface) 53b of the float 53.

A mask 510 is arranged in front of the iRED 58, and has a slit hole 510a through which light passes. A stopper member 511 is attached to the outer cylinder 52, and regulates rotation of the float 53, so that the float 53 is not rotated beyond a predetermined range.

The float 53 is rotatably held as follows. More specifically, pivots 512 having sharp distal ends are inserted under pressure in the upper and lower central portions of the float 53, as shown in FIG. 7 (a sectional view taken along a line A—A in FIG. 6). The inwardly opposing pivot bearings 56 are arranged at the distal ends of the upper and lower U-shaped arms of the float holder 55, and the sharp distal ends of the pivots 512 are fitted in the pivot bearings 56, thus holding the float.

An upper lid 513 is adhered to the outer cylinder 52 to seal the liquid 54 in the outer cylinder 52 by a known technique using, e.g., a silicone adhesive.

In the above-mentioned arrangement, the float 53 has a symmetrical shape about the rotational shaft 53a, and is formed of a material having the same specific gravity as that of the liquid 54 so as not to generate a rotational moment under the influence of the gravity in any posture, and so as not to substantially impose any load on the pivot shaft. In practice, it is impossible to perfectly eliminate an unbalance component to zero. However, as can be easily understood by those who are skilled in the art, since only a specific gravity difference acts as an unbalance component, the dimensional error is substantially very small, and the S/N ratio of friction to inertia is very good.

In the above-mentioned arrangement, even when the outer cylinder 52 is rotated about the rotational shaft 53a, since the liquid 54 in the cylinder 52 stands still with respect to absolute space by inertia, the float 53 in the floating state is not rotated, and hence, the outer cylinder 52 and the float 53 are relatively rotated about the rotational shaft 53a. The relative angular deviation between the outer cylinder 52 and the float 53 can be detected by the optical detection means using the iRED 58 and the PSD 59.

In the device with the above arrangement, the angular deviation is detected as follows.

Light emitted from the iRED 58 irradiates the float 53 via the slit hole 510a of the mask 510, is reflected by the slit-like reflection surface of the projection 53b, and then reaches the PSD 59. In this light transmission, the light is converted into substantially collimated light by the slit hole 510a and the slit-like reflection surface, and an image free from a blur is formed on the PSD 59.

Since the outer cylinder 52, the iRED 58, and the PSD 59 are fixed to the base plate 51, and are integrally moved, if a relative angular deviation motion occurs between the outer cylinder 52 and the float 53, the slit image on the PSD 59 moves by an amount corresponding to the deviation. Therefore, the output from the PSD 59, which is a photo-electric conversion element whose output changes according to the light-receiving position, becomes an output proportional to the positional deviation of the slit image, and the angular deviation of the outer cylinder 52 can be detected using the output as information.

The float 53 is formed of a permanent magnet material having the same specific gravity as that of the liquid 54, as described above, and is manufactured as follows.

When a fluorine-based inert liquid is used as the liquid 54, a permanent magnet material (e.g., ferrite) is contained as a filler in a plastic material as a base, and its content is adjusted to a volume content of about 8%, so that the float can have substantially the same specific gravity as the specific gravity "1.8" of the liquid. After or simultaneously when the float 53 is molded using these materials, the float can be magnetized in the direction of the shaft 53a to have the nature of the permanent magnet.

FIG. 9 is a sectional view taken along a line B—B in FIG. 6 and showing the relationship among the float 53, the yoke 57, and the coil 514.

As shown in FIG. 9, the float 53 is magnetized in the direction of the shaft 53a. In FIG. 9, the upper portion of the float is magnetized to be the N pole, and the lower portion thereof is magnetized to be the S pole. The line of magnetic force emerging from the N pole forms a closed magnetic circuit entering the S pole through the U-shaped yoke 57. When a current flows through the coil 514 from the back surface side of the drawing surface in FIG. 9 to the front surface side, the coil 514 receives a force in a direction of an arrow f according to the Fleming's left-hand rule. However, since the coil 514 is fixed to the outer cylinder 52, and cannot be moved, a force acts in a direction of an arrow F as a reaction, and the float 53 is driven by this force. This force is proportional to the current flowing through the coil 514, and may act in the opposing direction if the current flows in a direction opposite to the above-mentioned direction. That is, in the above arrangement, the float 53 can be desirably driven.

A spring force acting on the float 53 by this driving force is a force for maintaining the float 53 in a predetermined posture with respect to the outer cylinder 52 (i.e., for integrally moving the float 53) in principle. For this reason, if the spring force is too strong, the outer cylinder 52 and the float 53 are integrally moved, and a relative angular devia-tion for obtaining a target angular deviation does not occur. However, if the driving force (spring force) is sufficiently smaller than the inertia of the float 53, the float can respond to an angular deviation at a relatively low frequency.

FIG. 10 is a circuit diagram showing an electrical circuit of the angular deviation detection device with the above arrangement.

Current-voltage conversion amplifiers 515a and 515b (and resistors R33 to R36) convert photocurrents 517a and 517b generated by the PSD 59 based on reflected light 516 into voltages, and a differential amplifier 518 (and resistors R37 to R40) obtains a difference between the outputs from the current-voltage conversion amplifiers 515a and 515b, i.e., an angular deviation (a relative angular deviation motion between the outer cylinder 52 and the float 53). The output from the differential amplifier 518 is divided by resistors 519a and 519b to obtain a very small output, which is input to a driving amplifier 520 (a resistor R41, and transistors TR11 and TR12) for supplying a current to the coil 514 to perform negative feedback control (the wiring of the coil 514 and the magnetization direction of the float 53 are set, so that the float 53 is returned to the center when the differential amplifier 518 generates an output). Thus, a sufficiently smaller spring force (driving force) than the inertia of the liquid 54 is generated.

An adder amplifier 521 (and resistors R42 to R45) obtains a sum of the outputs from the amplifiers 515a and 515b (i.e., a total sum of the amounts of the reflected light 516 emitted from the iRED 58 and received by the PSD). The output from the adder amplifier 521 is input to a driving amplifier 522 (resistors R47 & R48, a transistor TR13, and a capacitor C11).

The iRED 58 very unstably changes its light-emitting amount due to a temperature difference. However, when the iRED 58 is driven based on the total sum of the light-receiving amounts, as described above, the total sum of photocurrents output from the PSD 59 can always be constant, and the angular deviation detection sensitivity of the differential amplifier 518 can be very stable.

FIG. 11 is an exploded perspective view showing a structure of a servo angular acceleration sensor as another vibration sensor.

In FIG. 11, a support portion 524 is integrally fixed to an outer frame bottom portion 523. The two ends of a shaft 526 are supported by the support portion 524 and bearings 525a and 525b such as ball bearings having low friction. A seesaw 528 attached with coils 527a and 527b is swingably supported by the shaft 526.

Magnetic circuit boards 530a and 530b as lid portions and permanent magnets 531a, 531b, and 532a, and 532b are arranged above and below the coils 527a and 527b and the seesaw 528 to be isolated from the coils 527a and 527b and the seesaw 528 and to oppose each other. The magnetic circuit boards 530a and 530b also serve as the lid portions of the outer frame, as described above. The permanent magnets 531a, 531b, and 532a, and 532b are mounted on magnetic circuit back boards 533a and 533b fixed to the bottom portions of the outer frame bottom portion 523.

A slit plate 534 with a slit 534a extending therethrough in the direction of thickness is arranged on the coil 527a of the seesaw 528. A photoelectric type deviation detector 535 such as an SPC (Separate Photo Diode) is arranged on the magnetic circuit board 530a serving as the lid portion of the outer frame above the slit 534a, and a light-emitting element 536 such as an infrared light-emitting diode is arranged on the magnetic circuit back board 533a below the slit 534a.

In the above arrangement, assuming that an angular acceleration a acts on the outer frame shown in FIG. 11, as indicated by an arrow 537, the seesaw 528 is relatively inclined in a direction opposite to that of the angular acceleration a, and this swing angle can be detected as the position of the beam emitted from the light-emitting element 536 via the slit 534a on the deviation detector 535.

Magnetic fluxes from the permanent magnets 531a and 531b form a closed magnetic circuit including the permanent magnets 531a and 531b→the coils 527a and 527b→the magnetic circuit boards 530a and 530b→the coils 527a and 527b→the permanent magnets 531a and 531b, and magnetic fluxes from the permanent magnets 532a and 532b form a closed magnetic circuit including the permanent magnets 532a and 532b→the magnetic circuit back boards 533a and 533b→the permanent magnets 532a and 532b. When control currents are supplied to the coils 527a and 527b, the seesaw 528 can be moved to both sides along the swing direction of the angular acceleration a according to the Fleming's rule.

FIG. 12 shows an example of an angular acceleration detection circuit used in the servo angular acceleration sensor with the above-mentioned structure.

This circuit is constituted by serially connecting a deviation amplifier 538 for amplifying the output from the deviation detector 535, a compensator 539 for maintaining this feedback circuit as a stable circuit system, a driving circuit 540 for further current-amplifying the amplified output from the deviation amplifier 538, and supplying the amplified output to the coil 527a or 527b, and the coil 527a or 527b.

In this example, the winding directions of the coils 527a and 527b, and the polarities of the permanent magnets 531a, 531b, 532a, and 532b are set, so that a force is generated in a direction opposite to the swing direction of the seesaw 528 by an external angular acceleration a when the coils 527a and 527b are energized.

The operation principle of the servo angular acceleration sensor with the above arrangement will be described below. When an angular acceleration a externally acts on the angular acceleration sensor with the above arrangement, as shown in FIG. 12, the seesaw 528 swings by its inertia in an opposite rotational direction relative to the outer frame, and hence, the slit 534a provided to the seesaw 528 is moved in an L direction. For this reason, the center of a light beam incident from the light-emitting element 536 to the deviation detector 535 deviates, and the deviation detector 535 generates an output proportional to the deviation amount.

This output is amplified by the deviation amplifier 538, and is further current-amplified by the driving circuit 540 via the compensator. The coil 527a or 527b is energized by the amplified output.

When the coil 527a or 527b is energized by the control current, a force in an R direction opposite to the L direction of the external angular acceleration a is generated in the seesaw 528, and the control current is adjusted and generated, so that a light beam incident on the deviation detector 535 is returned to an initial position when no external angular acceleration a is applied.

In this case, the value of the control current flowing through the coil 527a or 527b is proportional to the rotational force acting on the seesaw 528. Furthermore, the rotational force acting on the seesaw 528 is proportional to a force for returning the seesaw 528 to the origin, i.e., the magnitude of the external angular acceleration a. For this reason, when the current is read as a voltage V through a resistor 541, the magnitude of the angular acceleration a as control information necessary for, e.g., an image blur suppression system for a camera, can be obtained.

FIG. 13 is a circuit diagram showing in more detail the angular acceleration detection circuit shown in FIG. 12.

In FIG. 13, an amplifier 538a, and resistors 538b and 538c correspond to the deviation amplifier 538 shown in FIG. 12, and voltage-convert and amplify a photocurrent from the deviation detector 535 to perform position detection. A capacitor 539a, and resistors 539b and 539c correspond to the compensator 539, and a driving amplifier 540a, transistors 540b and 540c, and resistors 540d, 540e, and 540f correspond to the driving circuit for driving the coil 527a or 527b.

The angular acceleration obtained as described above is integrated twice by a known integration circuit to obtain angular deviation information, and a correction optical system is driven based on the angular deviation information like in the angular deviation detection device, thereby performing an antivibration operation.

FIG. 14 is a diagram showing an arrangement of a correction optical mechanism suitably used in this system. A correction lens 545 is movable in two orthogonal directions [a pitch direction 546p and a yaw direction 546y (corresponding to 61p and 61y)] perpendicular to the optical axis. The arrangement allowing the movement of the lens 545 will be described below.

In FIG. 14, a fixing frame 547 for holding the correction lens 545 is slidable along a pitch slide shaft 549p via sliding bearings 548p of, e.g., a polyacetal resin (to be referred to as a POM hereinafter). The fixing frame 547 is sandwiched between pitch coil springs 551p coaxial with the pitch slide shaft 549p, and is held near a neutral position. The pitch slide shaft 549p is attached to a first holding frame 550.

A pitch coil 552p attached to the fixing frame 547 is placed in a magnetic circuit constituted by a pitch magnet 553p and a pitch yoke 554p. When a current flows through the coil 552p, the fixing frame 547 is driven in the pitch direction 546p. The pitch coil 552p has a pitch slit 555p, and the pitch slit 555p is used for detecting the position of the fixing frame 547 in the pitch direction 546p in combination with a light-emitting element 556p (infrared light-emitting diode iRED) and a light-receiving element 557p (semiconductor position detection element PSD).

Sliding bearings 548y of, e.g., a POM are fitted in the first holding frame 550, and are slidable along a housing 558 attached with a yaw slide shaft 549y. Since the housing 558 is attached to a lens barrel (not shown), the first holding frame 550 is movable in the yaw direction 546y with respect to the lens barrel. Yaw coil springs 551y are arranged coaxially with the yaw slide shaft 549y, and the first holding frame 550 is held near a neutral position like in the fixing frame 547.

The fixing frame 547 is provided with a yaw coil 552y, and is also driven in the yaw direction 546y in association with a yaw magnet 553y and a yaw yoke 554y sandwiching the yaw coil 552y therebetween. The yaw coil 552y has a yaw slit 555y, and the slit 555y is used for detecting the position of the fixing frame 547 in the yaw direction 546y like in the pitch direction.

In FIG. 14, when the outputs from the PSD 557p and a PSD 557y are amplified by amplifiers 559p and 559y, and are input to coils (the pitch and yaw coils 552p and 552y) via illustrated circuits (to be described later), the fixing frame 547 is driven, and the outputs from the PSDs 557p and 557y change. When the driving directions (polarities) of the coils 552p and 552y are set in directions to decrease the outputs from the PSDs 557p and 557y, closed systems (closed loops) are formed, and are stabilized at points where the outputs from the PSDs 557p and 557y become almost zero.

Compensators 560p and 560y are circuits for further stabilizing the system shown in FIG. 14. Adders 563p and 563y are circuits for respectively adding the outputs from the amplifiers 559p and 559y and input command signals 562p and 562y. Driving circuits 561p and 561y are circuits for compensating for currents to be applied to the coils 552p and 552y.

When the external command signals 562p and 562y are supplied to the above-mentioned system, the correction lens 545 is driven in the pitch and yaw directions 546p and 546y to be very faithful with the command signals 562p and 562y.

FIG. 15 is a circuit diagram showing the details of a driving means for driving the correction optical mechanism. In this case, a circuit for only the pitch direction 546p will be described below.

Current-voltage conversion amplifiers 563a and 563b convert photocurrents generated from the PSD 557p (consisting of resistors R1 and R2) by the iRED 556p into voltages. A differential amplifier 565 obtains a difference between the outputs from the current-voltage conversion amplifiers 563a and 563b. This difference signal represents the position of the correction lens 545 in the pitch direction 546p. The current-voltage conversion amplifiers 563a and 563b, the differential amplifier 565, and resistors R3 to R10 constitute the amplifier 559p shown in FIG. 14.

An amplifier 566 adds the command signal 562p to the difference signal output from the differential amplifier 565, and constitutes the adder 563p shown in FIG. 14 together with resistors R11 to R14.

Resistors R15 and R16, and a capacitor C1 constitute a known phase advance circuit. This circuit corresponds to the compensator 560p shown in FIG. 14, and stabilizes the system.

The output from the adder 563p is input to a driving amplifier 567 through the compensator 560p. The driving amplifier 567 generates a driving signal for the coil 552p, and the correction lens 545 deviates. The driving amplifier 567, a resistor R17, and transistors TR1 and TR2 constitute the driving circuit 561p shown in FIG. 14.

An adder amplifier 568 obtains a sum of the outputs from the current-voltage conversion amplifiers 563a and 563b (a total sum of the light-receiving amounts of the PSD 557p). A driving amplifier 569 for receiving the output from the adder amplifier 568 drives the iRED 556p according to the received output. The adder amplifier 568, the driving amplifier 569, resistors R18 to R22, and a capacitor C2 constitute a driving circuit (not shown in FIG. 14) for the iRED 556p.

The light projection amount of the iRED 556p changes very unstably due to, e.g., a change in temperature, and the positional sensitivity of the differential amplifier 565 changes accordingly. However, as described above, when the iRED 556p is controlled by the above-mentioned driving circuit to obtain a constant total sum of the light-receiving amounts, the positional sensitivity can be prevented from changing.

FIG. 16 is a perspective view showing the structure of the correction optical mechanism using a variable vertical angle prism.

In FIG. 16, a silicone-based liquid 570 having a high refractive index is sealed without bubbles by two glass plates 571p and 571y, and a polyethylene film 572. The glass plate 571p is held by a pitch holding frame 573p, and the pitch holding frame 573p is axially supported to be rotatable about a pitch shaft 574p. The glass plate 571y is held by a yaw holding frame 573y, and the yaw holding frame 573y is axially supported to be rotatable about a yaw shaft 574y.

The pitch and yaw holding frames 573p and 573y are respectively provided with pitch and yaw coils 575p and 575y. Since these coils are placed in closed magnetic circuits formed by fixed pitch and yaw magnets 576p and 576y and pitch and yaw yokes 577p and 577y, when currents flow through the pitch and yaw coils 575p and 575y, the pitch and yaw holding frames 573p and 573y are rotated about the pitch and yaw shafts, respectively.

Deviation detection light-receiving elements 579p and 579y are respectively attached to arms 578p and 578y of the pitch and yaw holding frames 573p and 573y. These light-receiving elements detect rotations about the pitch and yaw shafts 574p and 574y on the basis of focused light beams radiated from fixed infrared light-emitting elements 580p and 580y via holes 581p and 581y. Known positional control is also performed between the deviation detection light-receiving elements 579p and 579y and the pitch and yaw coils 575p and 575y. Since this control has been described in the slide type correction optical mechanism, a detailed description thereof will be omitted.

In the above-mentioned arrangement, when the pitch holding frame 573p is rotated about the pitch shaft, and the glass plate 571p is inclined about the pitch shaft 574p, the light beam transmitted through the liquid 570 having the high refractive index is deflected in the direction of the arrow 546p; when the yaw holding frame 573y is rotated about the yaw shaft, and the glass plate 571y is inclined about the yaw shaft 574y, the light beam is deflected in the direction of the arrow 546y.

In the above-mentioned antivibration system, at least one coil and one light-emitting element are arranged in each of vibration sensors (angular deviation detection devices or servo angular deviation accelerometers) for detecting vertical and horizontal vibrations, and two coils and two light-emitting elements are arranged in the correction optical mechanism. Therefore, a total of four or more coils and four light-emitting elements are arranged, and the total current consumption is not small.

When the antivibration system is driven by a camera battery, if the voltage of the battery is low, the battery voltage immediately drops further due to the needs of the antivibration system, and other faculties (a shutter opening/closing faculty, an automatic exposure faculty, and an automatic focusing mechanism) of the camera are influenced. In the worst case, the photographing operation itself is disabled (when only the antivibration system is disabled, the photographing operation can be executed by "firmly holding the camera, fixing the camera at an immovable point, or the like", but if other faculties are also disabled, the photographing operation itself is disabled).

SUMMARY OF THE INVENTION

One aspect of the invention is to provide an antivibration system comprising control means for changing a faculty of the antivibration system depending on the states of faculties other than the antivibration system, and blur caution warning means for generating a blur caution warning according to an output from vibration detection means, the control means including discrimination means for discriminating whether or not the power voltage of the system is lowered by a predetermined value or more, and for, when it is determined that the power voltage is lowered by the predetermined value or more, disabling the antivibration system and driving the blur caution warning means. Thus, the power consumption of the antivibration system itself is saved, and faculties other than the antivibration system can be prevented from being influenced by the antivibration system.

Furthermore, one aspect of the invention is to provide an antivibration system comprising control means for changing a faculty of the antivibration system depending on the states of faculties other than the antivibration system, and blur caution warning means for generating a blur caution warning according to an output from vibration detection means, the control means including discrimination means for discriminating whether or not a power voltage of the system is lowered by a predetermined value or more, and for, when it is determined that the power voltage is lowered by the predetermined value or more, disabling the antivibration system and driving the blur caution warning means, and/or another discrimination means for discriminating whether or not the shutter speed is higher than a reference shutter speed, and for, when it is determined that the shutter speed is higher than the reference shutter speed, disabling the antivibration system, and/or still another discrimination means for discriminating whether or not lens focal length information is smaller than reference focal length information, and for, when it is determined that the lens focal length information is smaller than the reference focal length information, disabling the antivibration system. Whether or not the antivibration system is disabled is determined according to the states of faculties other than the antivibration system, i.e., depending on whether or not the power voltage of the camera is lowered by the predetermined value or more, or whether or not the shutter speed is higher than the reference shutter speed, or whether or not the lens focal length information is smaller than the reference focal length information, or on the basis of a combination of information indicating whether or not the shutter speed is higher than the reference shutter speed, and information indicating whether or not the lens focal length information is smaller than the reference focal length information. Thus, a camera with an antivibration faculty, which can save power consumption of the antivibration system itself, and can eliminate influences of the antivibration system on faculties other than the antivibration system, can be provided.

DETAILED DESCRIPTION OF THE PREFERRED EMBODIMENTS

Figure 1:
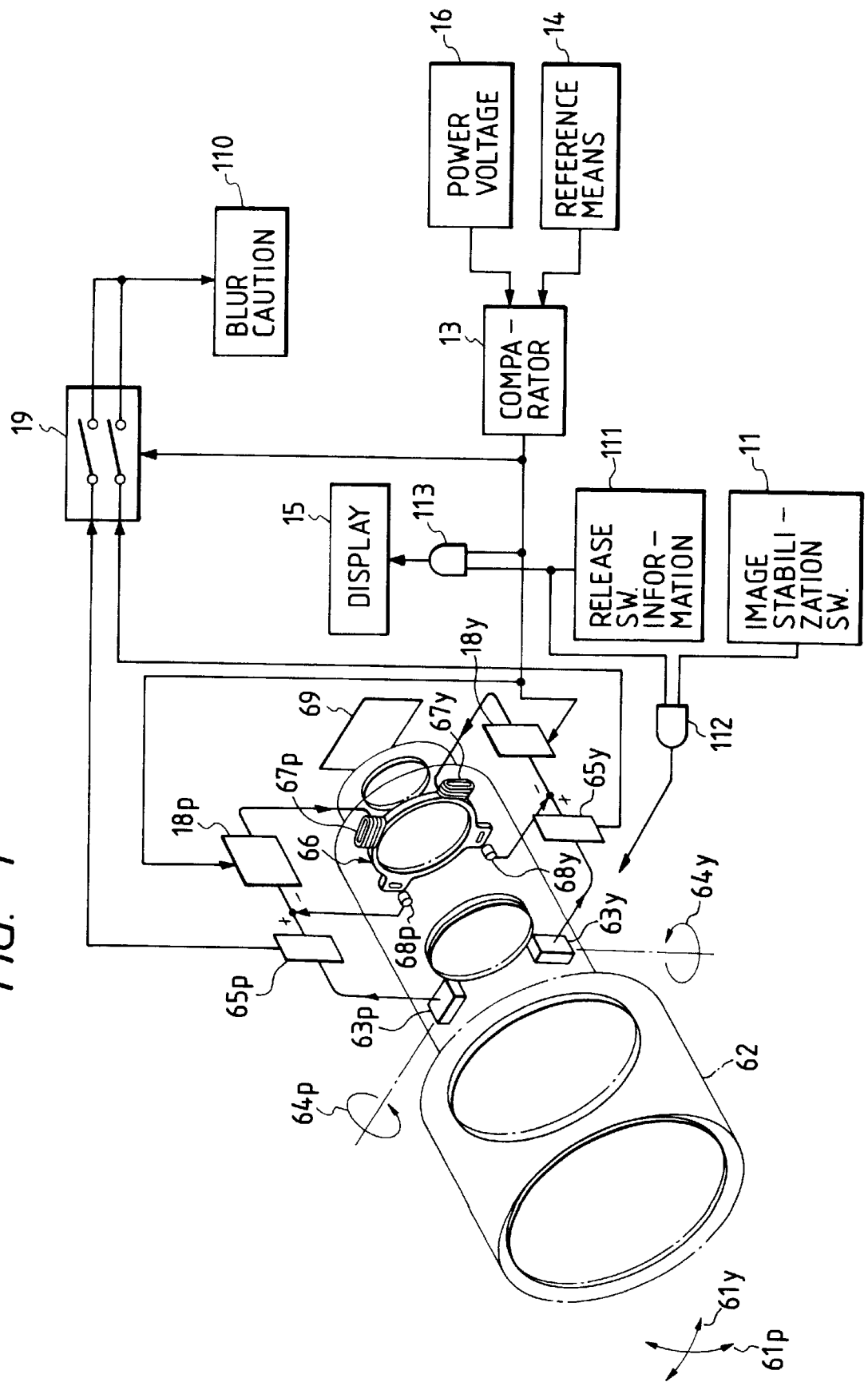
FIG. 1 is a diagram showing an arrangement of a camera with an antivibration faculty according to the first embodiment of the present invention.
Figure 5:
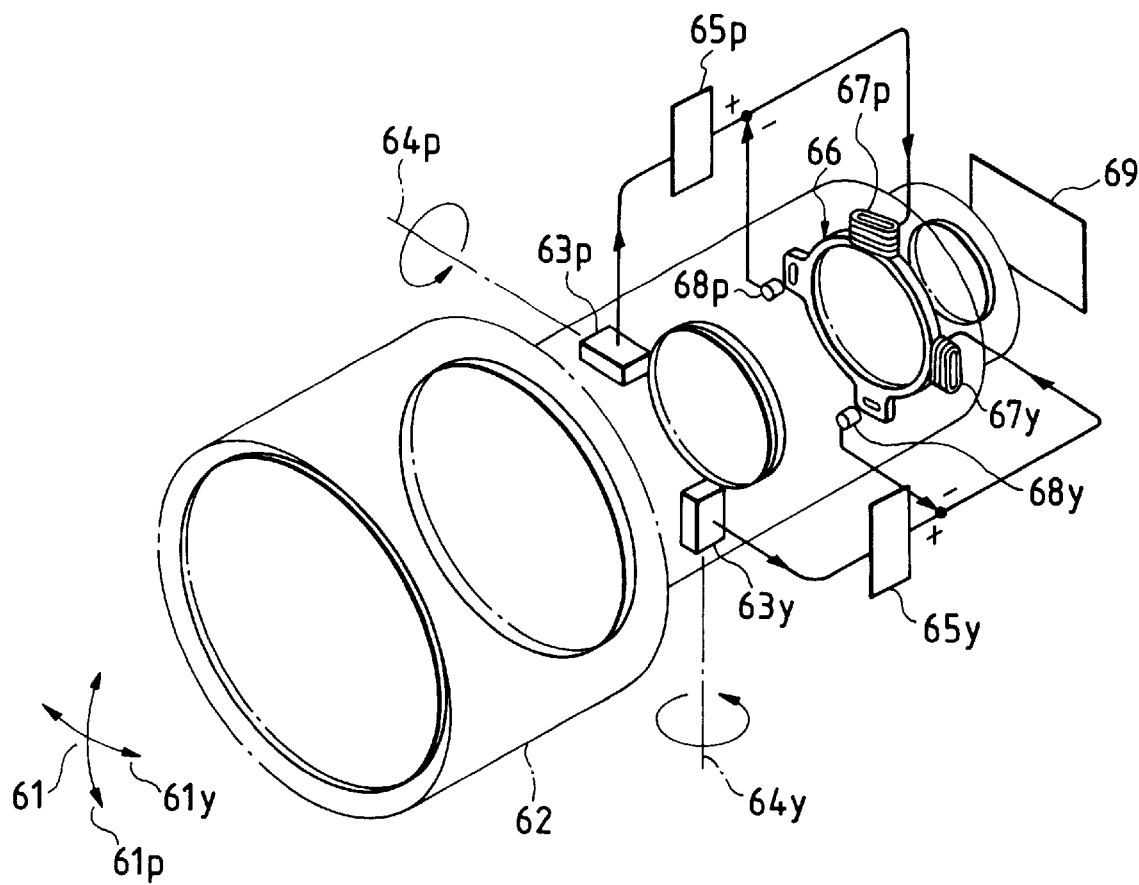
FIG. 5 is a schematic perspective view showing an arrangement of a conventional antivibration system.
Figure 6:
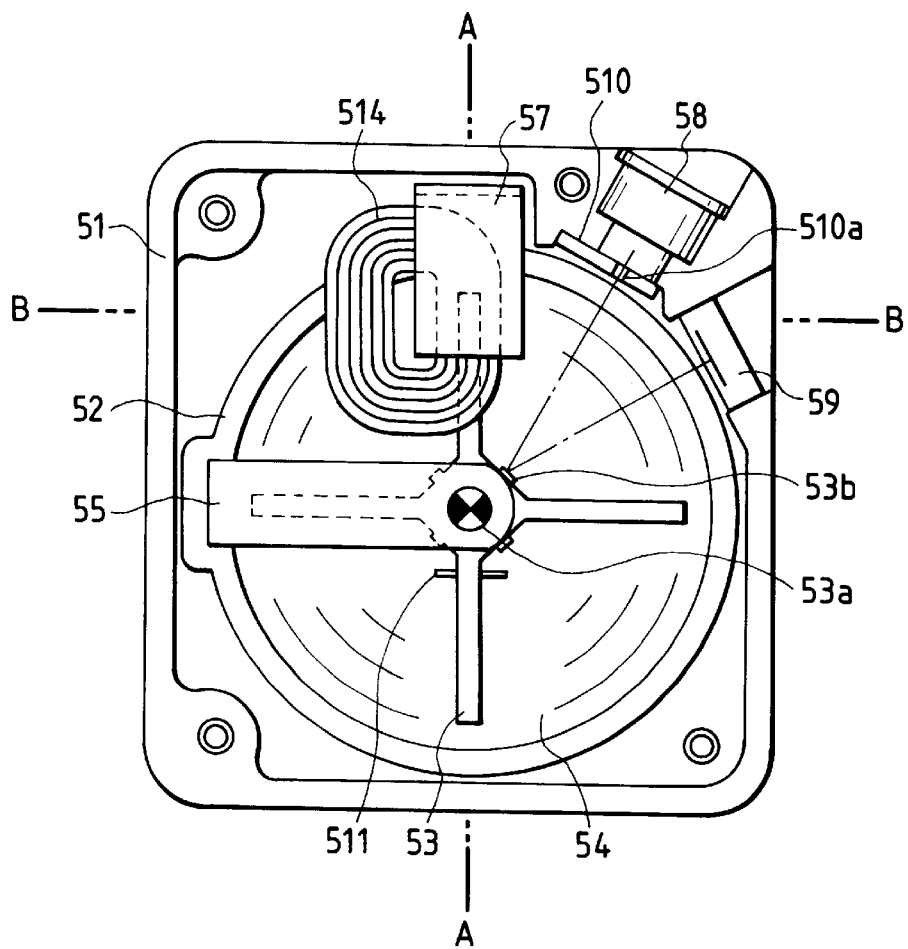
FIG. 6 is a plan view showing an angular deviation detection device as one conventional vibration detection means.
Figure 7:
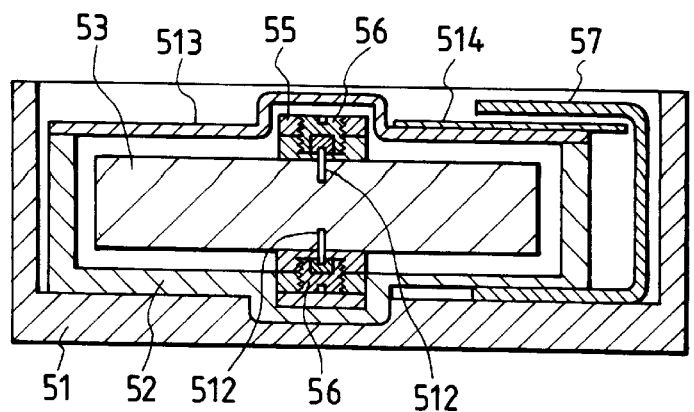
FIG. 7 is a sectional view taken along a line A—A of FIG. 6.
Figure 8:
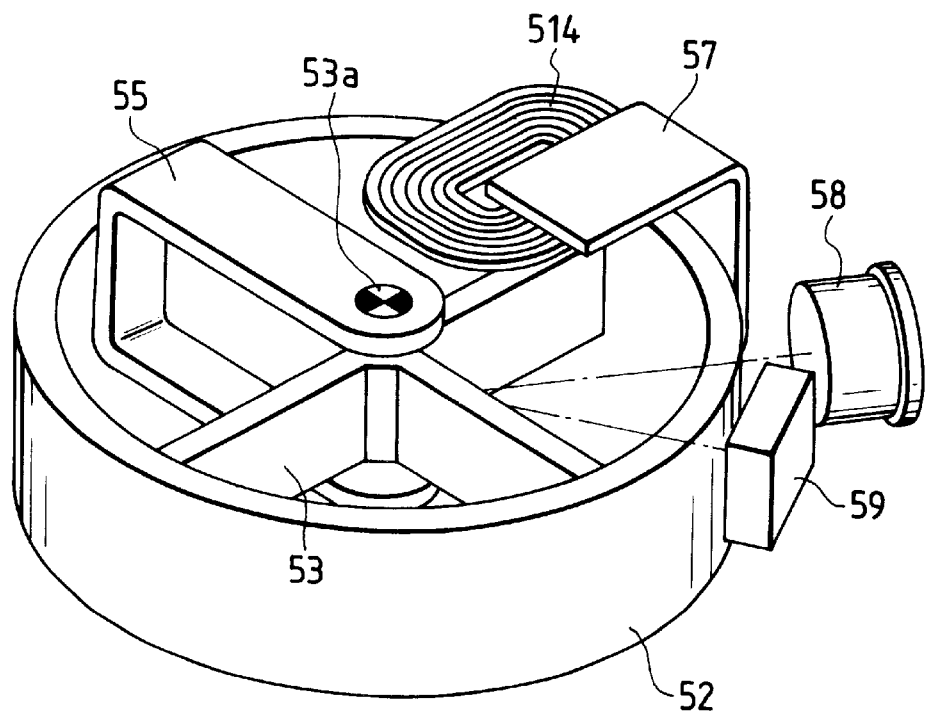
FIG. 8 is a perspective view of the angular deviation detection device shown in FIG. 6.
Figure 9:
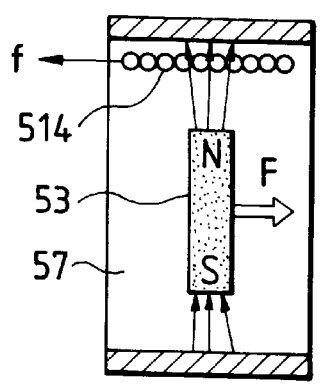
FIG. 9 is a sectional view taken along a line B—B in FIG. 6.
Figure 10:
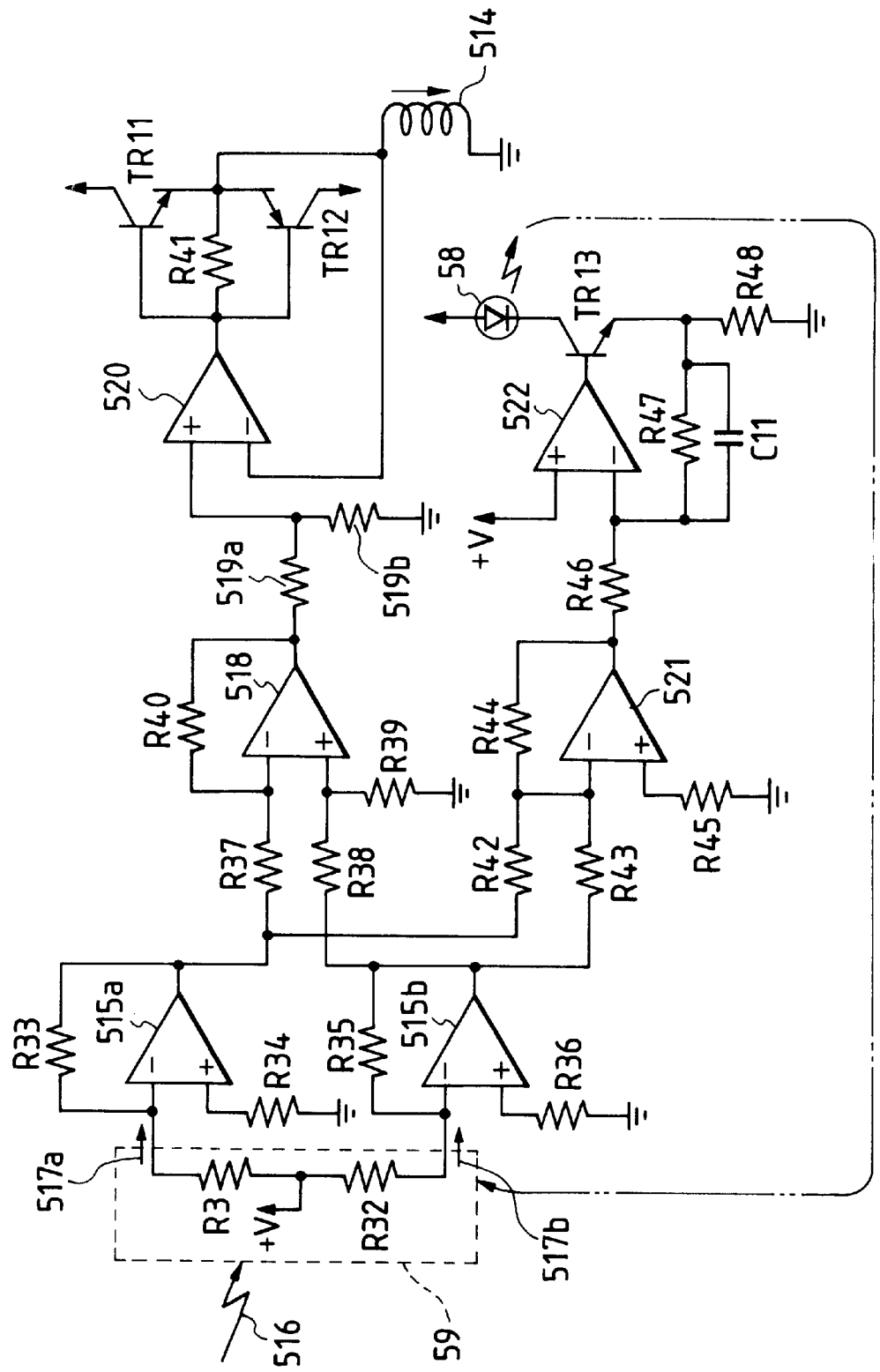
FIG. 10 is a circuit diagram showing an electrical arrangement of the angular deviation detection device shown in FIG. 6.
Figure 11:
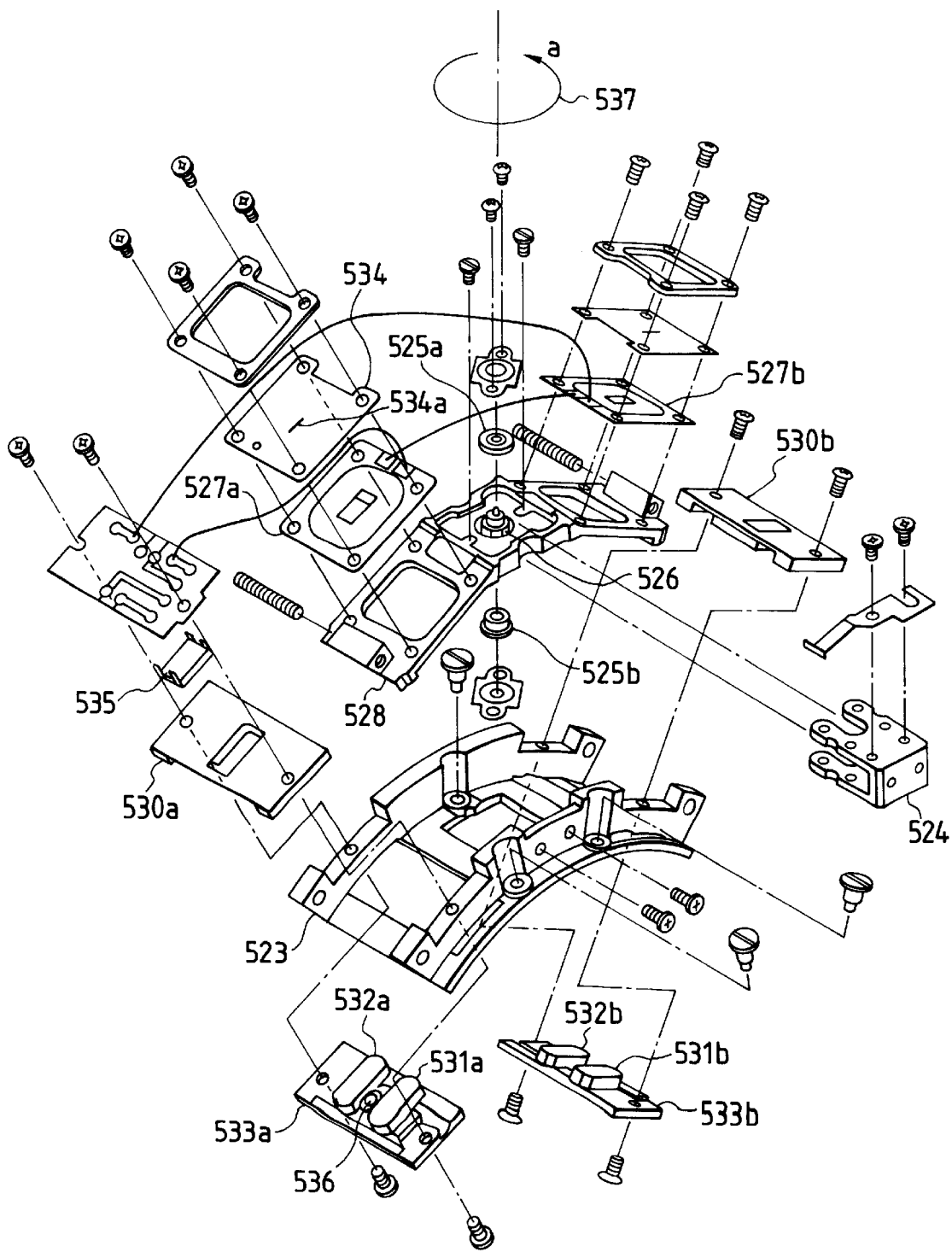
FIG. 11 is an exploded perspective view showing an arrangement of a servo angular accelerometer as another conventional vibration detection means.
Figure 12:
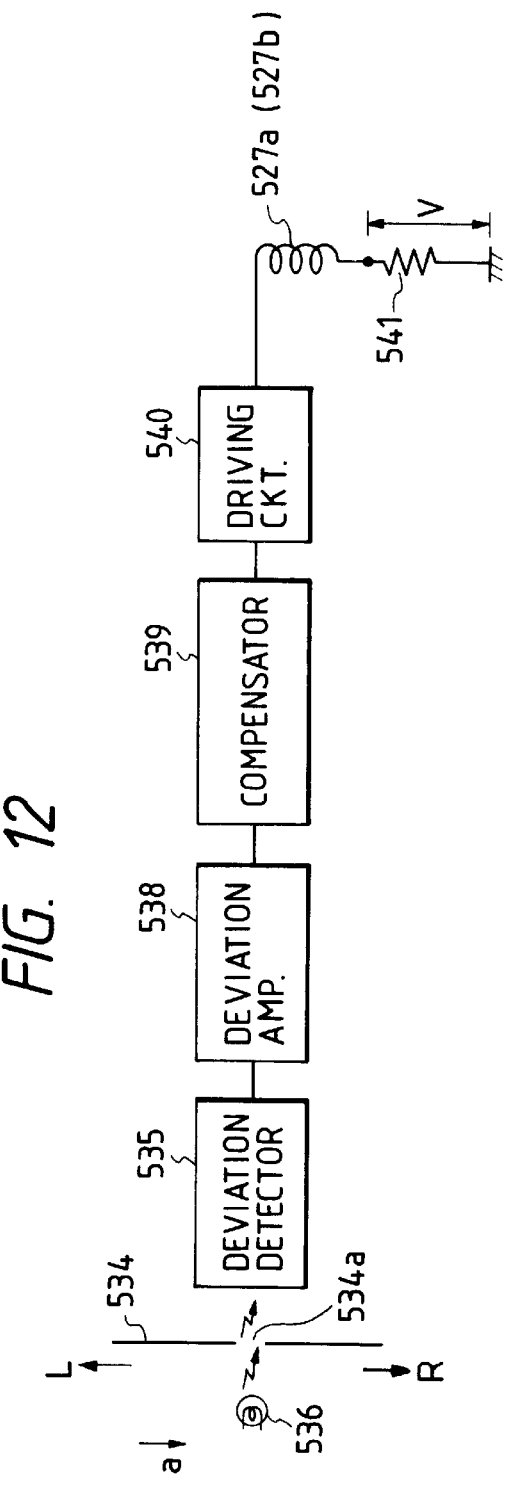
FIG. 12 is a block diagram showing an electrical arrangement of the servo angular accelerometer shown in FIG. 11.
Figure 13:
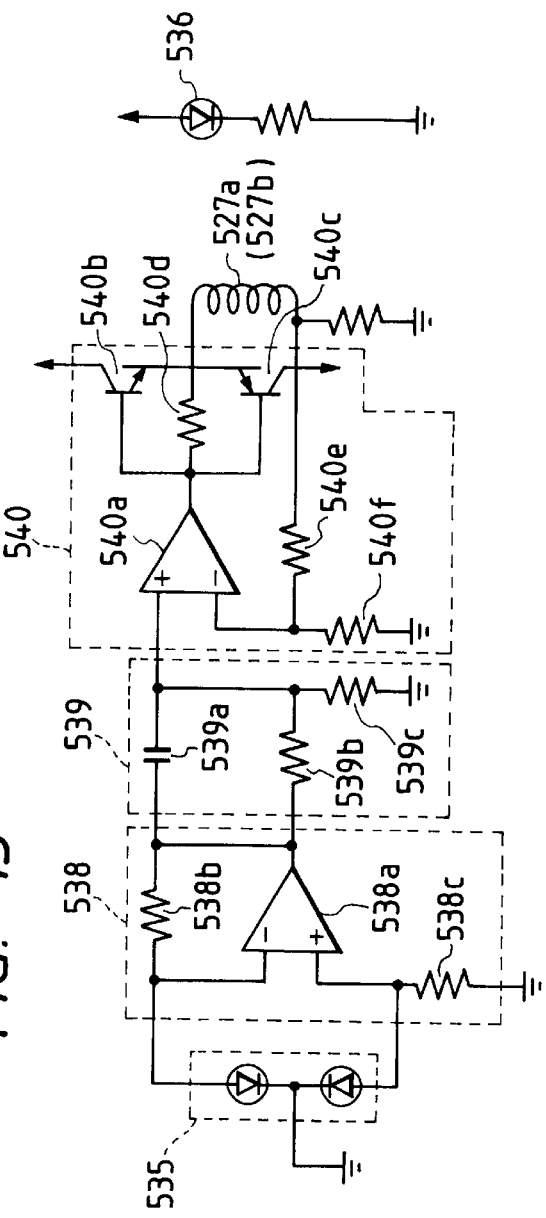
FIG. 13 is a circuit diagram showing the details of the electrical arrangement shown in FIG. 12.
Figure 14:
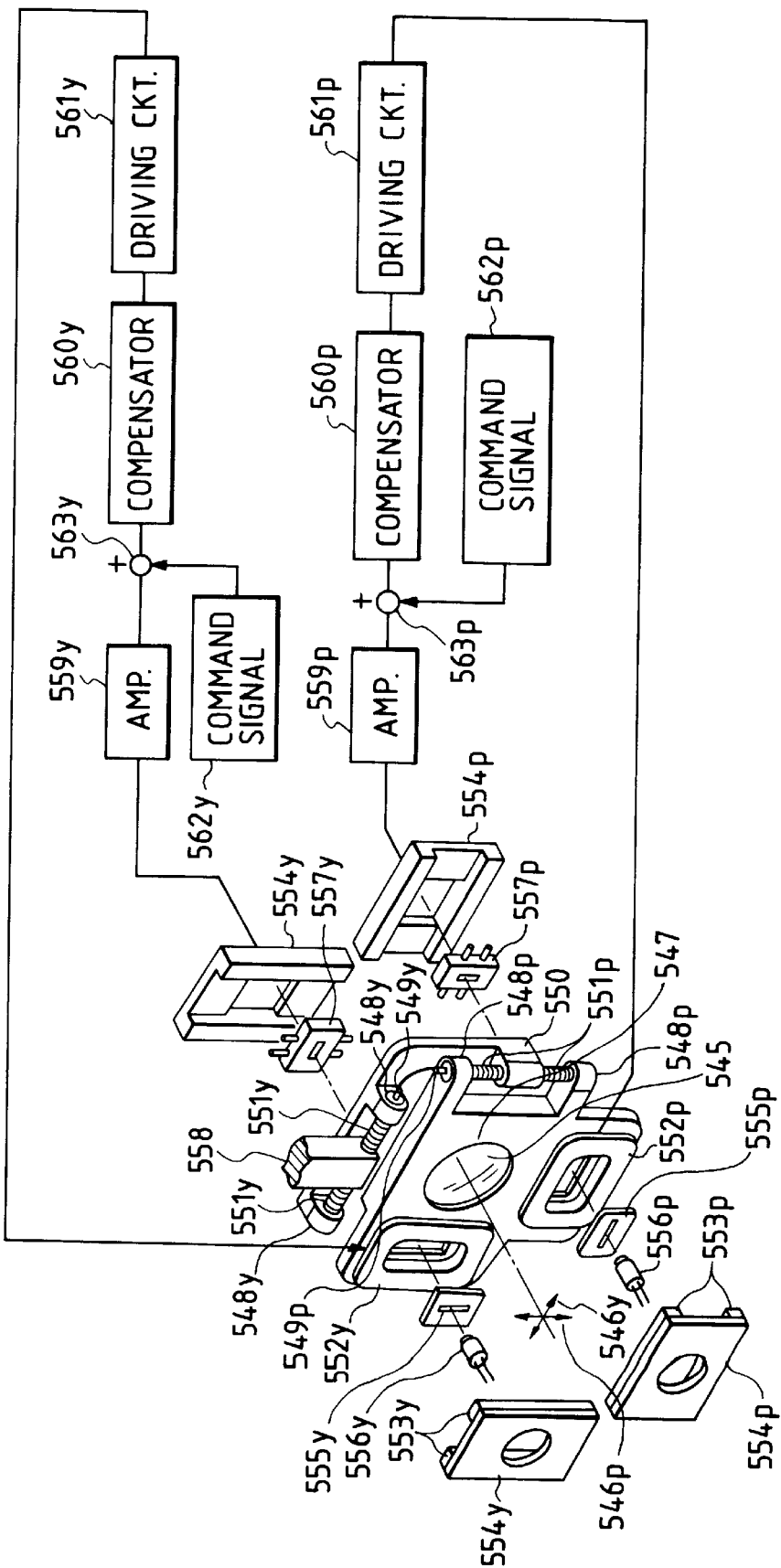
FIG. 14 is a diagram showing mechanical and electrical arrangements of a correction optical system in the antivibration system shown in FIG. 5.
Figure 15:
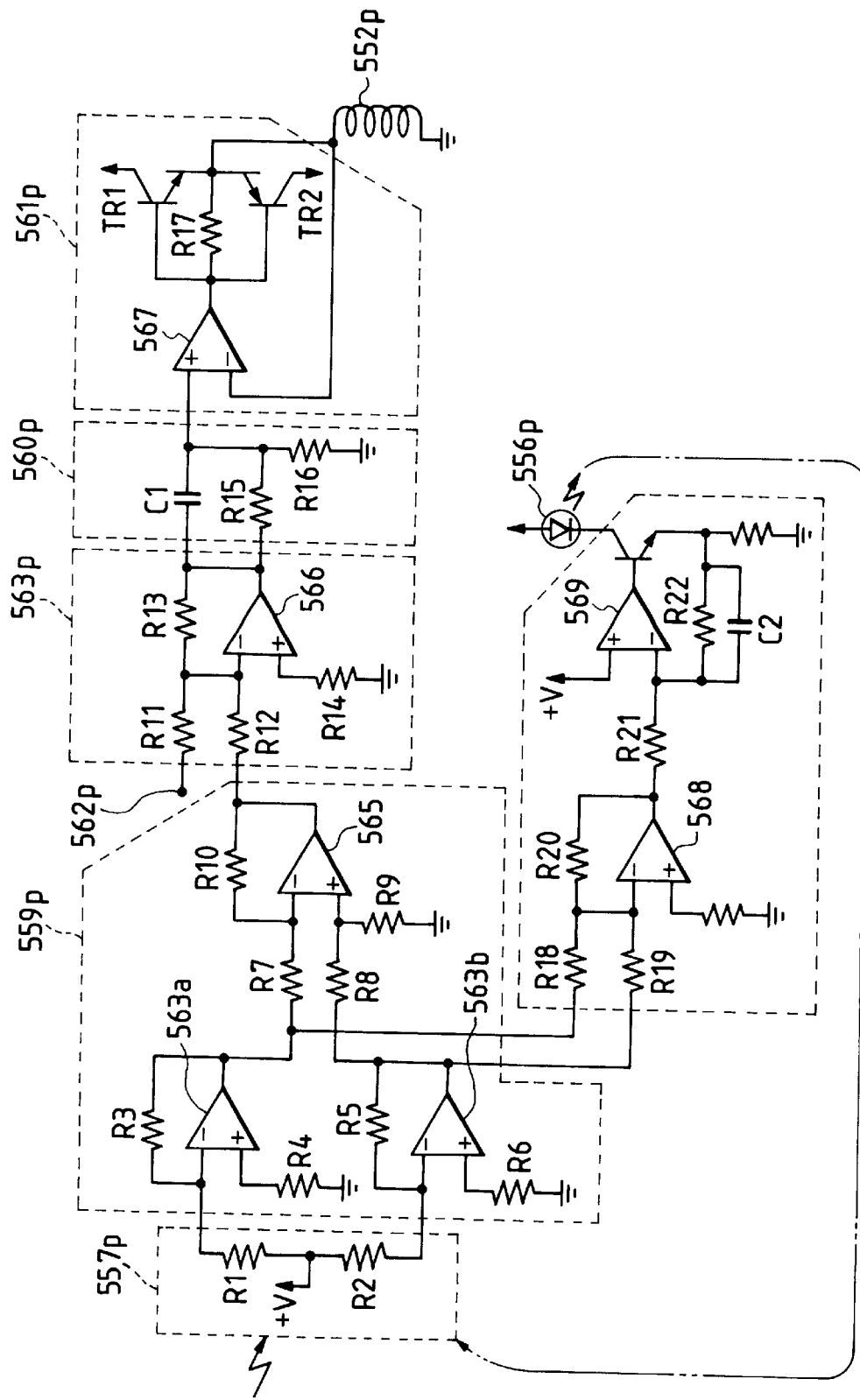
FIG. 15 is a circuit diagram showing the details of the electrical arrangement shown in FIG. 14.
Figure 16:
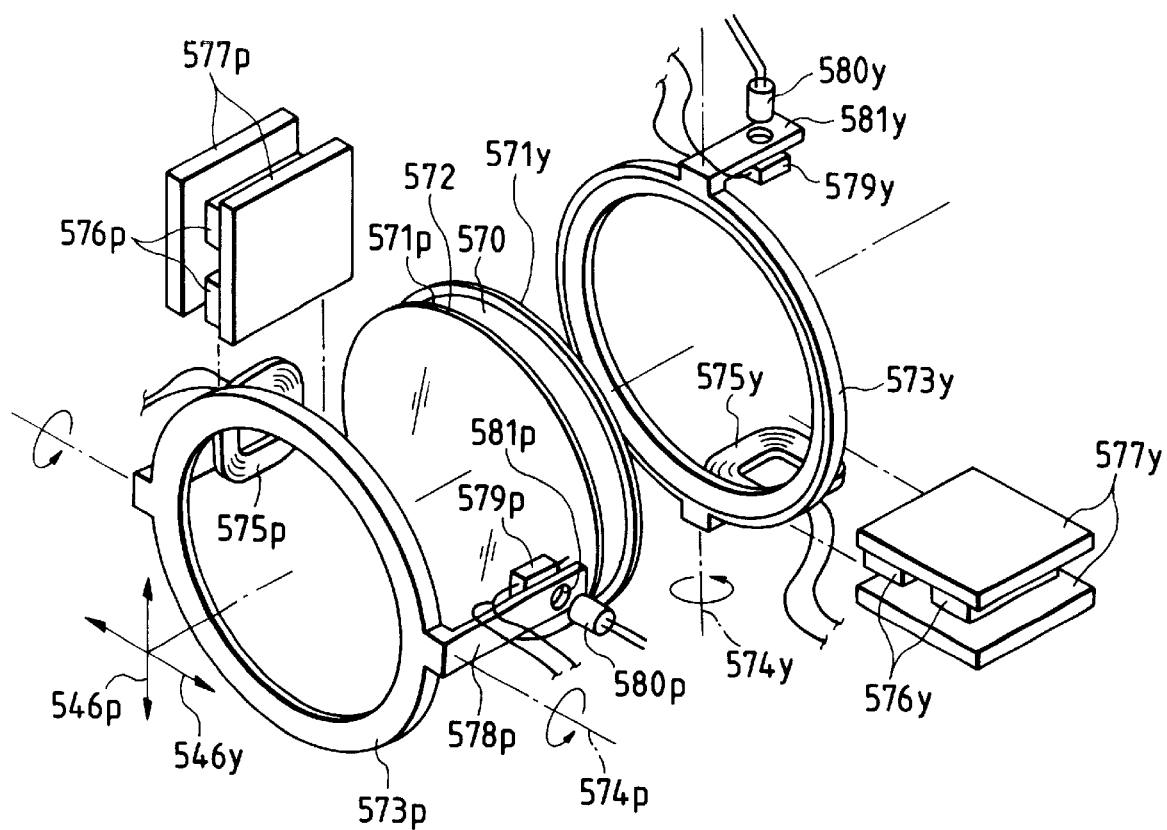
FIG. 16 is a perspective view showing another correction optical mechanism in the antivibration system shown in FIG. 5.

FIG. 1 is a schematic diagram showing an arrangement of a camera with an antivibration (image stabilization) faculty according to the first embodiment of the present invention. The same reference numerals in FIG. 1 denote the same parts as in FIG. 5.

The camera shown in FIG. 1 includes an image stabilization switch 11, switching means (e.g., analog switches) 18p, 18y, and 19, a comparator 13, a reference means 14 (a means for generating a reference voltage V1 in this embodiment), a display 15 for displaying a disabled state of an antivibration system, a power voltage means 16 for outputting battery voltage information, a blur caution warning means 110, a release switch information output means 111 for outputting information according to a depression of a release switch, and AND gates 112 and 113.

In the above-mentioned arrangement, the antivibration system is enabled (by the AND gate 112) when a signal from the image stabilization switch 11 is into and gate 112 in a state wherein the switching means 18p and 18y are closed, and release switch first-stroke depression information is input from the release switch information output means 111.

Assuming that the antivibration system is active, and the battery voltage of the camera drops to be lower than the reference voltage V1 output from the reference means 14, the comparator 13 outputs a signal, and the switching means 18p and 18y are opened by this signal. Then, a correction optical system 66, which has the largest current consumption, is disabled.

Note that the reference voltage V1 is a voltage determined in such a manner that when the battery voltage of the camera is equal to or lower than the reference voltage V1, if the antivibration system is enabled, the battery voltage immediately drops, and faculties other than the antivibration system are also disabled.

The signal from the comparator 13 is input to the display 15 through the AND gate 113, and the release switch first-stroke depression information is also input from the release switch information output means 111 to the display 15 through the AND gate 113. Thus, the display 15 is driven to display data indicating that the antivibration system is disabled.

Furthermore, the signal from the comparator 13 is input to the switching means 19, and the switching means 19 is closed in response to this signal. Thus, the outputs from vibration detection warning means 63p and 63y are supplied to the blur caution means 110 through calculation circuits 65p and 65y. The blur caution means 110 generates a hand vibration caution warning or signal when the outputs from the vibration detection means 63p and 63y are increased, i.e., the vibration becomes large.

With the above-mentioned arrangement, when the battery voltage becomes equal to or lower than the reference voltage V1, the correction optical mechanism is disabled. Therefore, an immediate voltage drop caused by the antivibration system can be prevented, and other faculties, i.e., a shutter opening/closing faculty, an automatic exposure faculty, an automatic focusing mechanism, and the like can be prevented from being disabled due to the lowered battery voltage.

In this case, since the display 15 displays a message that the antivibration system is disabled, and the blur caution means 110 generates an accurate hand vibration caution warning, the photographer firmly re-establishes the camera or executes a photographing operation while urging the camera against an immovable body such as a tree or a handrail, thereby preventing a hand from influencing the camera vibration.

Figure 2:
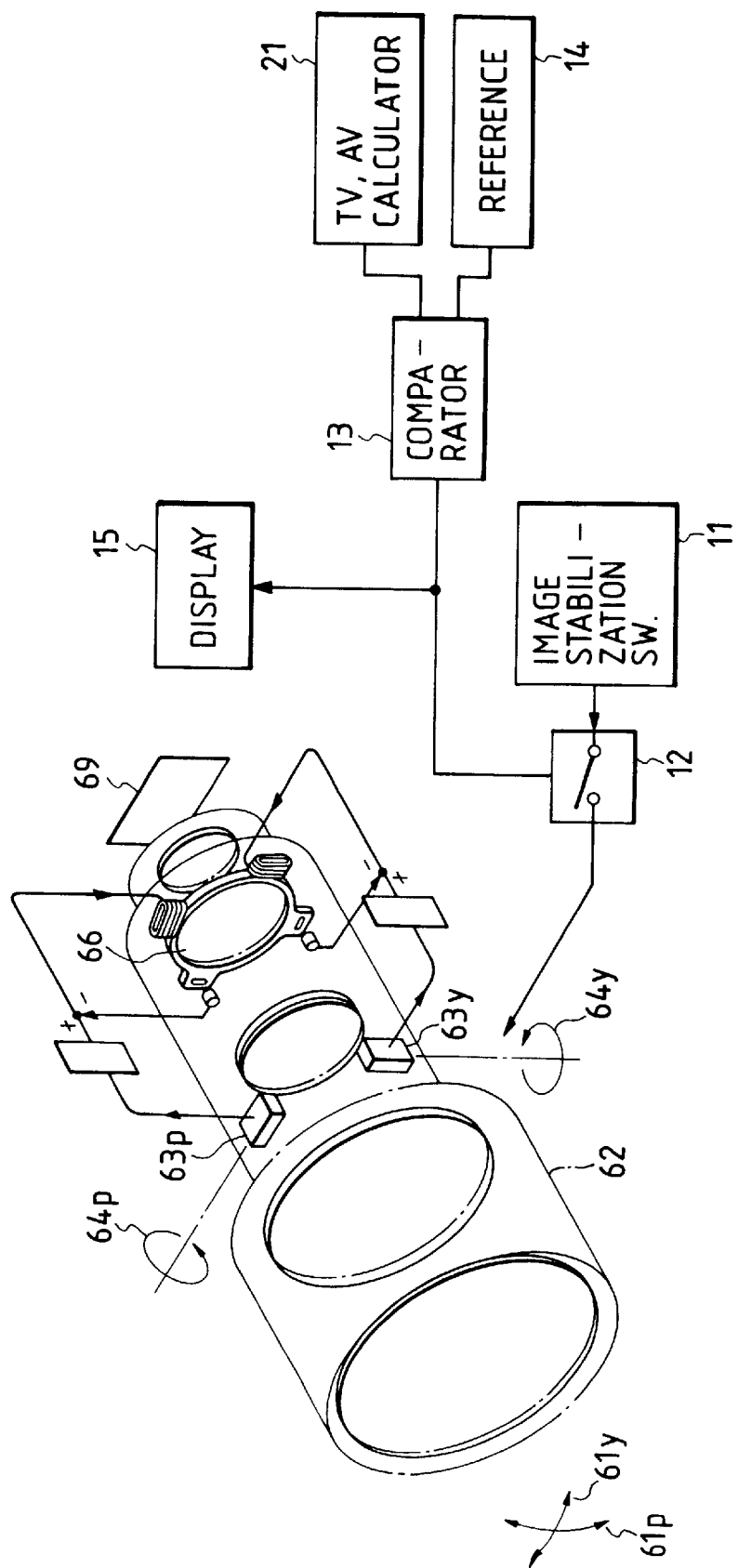
FIG. 2 is a diagram showing an arrangement of a camera with an antivibration faculty according to the second embodiment of the present invention.

FIG. 2 is a schematic diagram showing a camera with an antivibration faculty according to the second embodiment of the present invention. The same reference numerals in FIG. 2 denote the same parts as in FIG. 1.

The difference from the first embodiment is as follows. That is, shutter speed information from a Tv, Av calculator 21 is compared with a reference shutter speed from a reference means 14. When the current shutter speed is higher than the reference shutter speed, a signal is output from a comparator 13 to disable the antivibration system itself (in FIGS. 2 to 4, when the antivibration system is disabled, not only a correction optical system 66 but also vibration detection means 63p and 63y are disabled).

The antivibration system is enabled when a signal from an image stabilization switch 11 is input, and a release switch is depressed to a first-stroke position. In this case, when the release switch is depressed to the first-stroke position before the antivibration system is enabled, a photometry means (not shown) operates to determine the shutter speed. For this reason, when the shutter speed at that time is higher than the reference shutter speed, the antivibration system is disabled.

Similarly, when a shutter speed is determined by an external operation of, e.g., a shutter dial, and the shutter speed at that time is higher than the reference speed, the antivibration system is disabled even when the release switch is depressed to the first-stroke position.

With the above-mentioned arrangement, when the shutter speed is higher than the reference shutter speed, and there is no fear of a hand vibration, the antivibration system is disabled to prevent the battery from being wasted.

Figure 3:
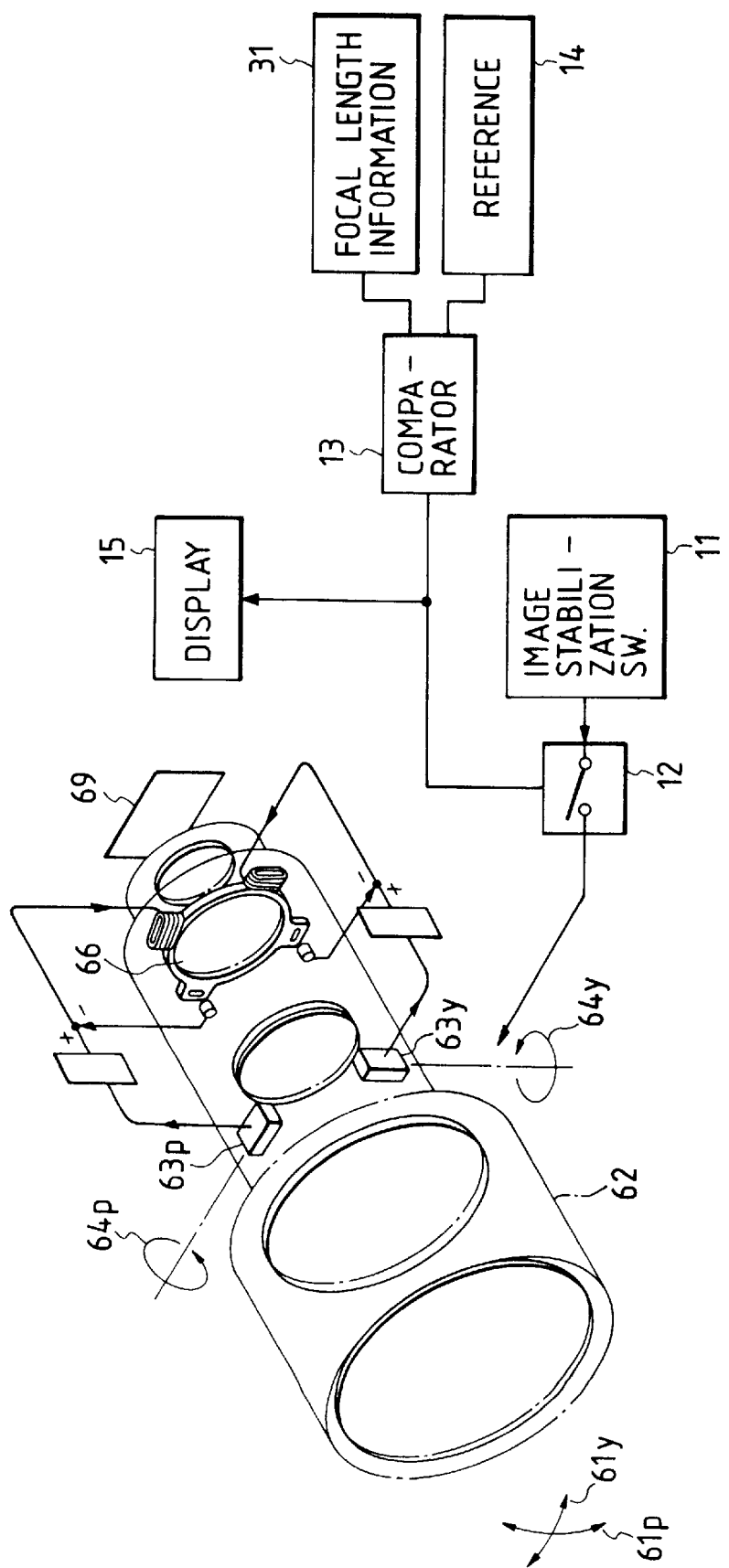
FIG. 3 is a diagram showing an arrangement of a camera with an antivibration faculty according to the third embodiment of the present invention.

FIG. 3 is a schematic diagram showing an arrangement of a camera with an antivibration faculty according to the third embodiment of the present invention. The same reference numerals in FIG. 3 denote the same parts as in FIGS. 1 and 2.

In this embodiment, whether or not an antivibration system is disabled is determined based not on the shutter speed but on focal length information of a zoom lens. More specifically, when focal length information from a focal length information output means 31 is smaller than a reference focal length output from a reference means 14, a signal is output from a comparator 13, and a switching means 12 is opened, thereby disabling the antivibration system.

With the above-mentioned arrangement, when a short focal length, vulnerable to the smallest influence of a hand vibration is set, the antivibration operation is stopped. Only when a long focal length is set, the antivibration operation is performed. Therefore, the battery can be prevented from being wasted.

Figure 4:
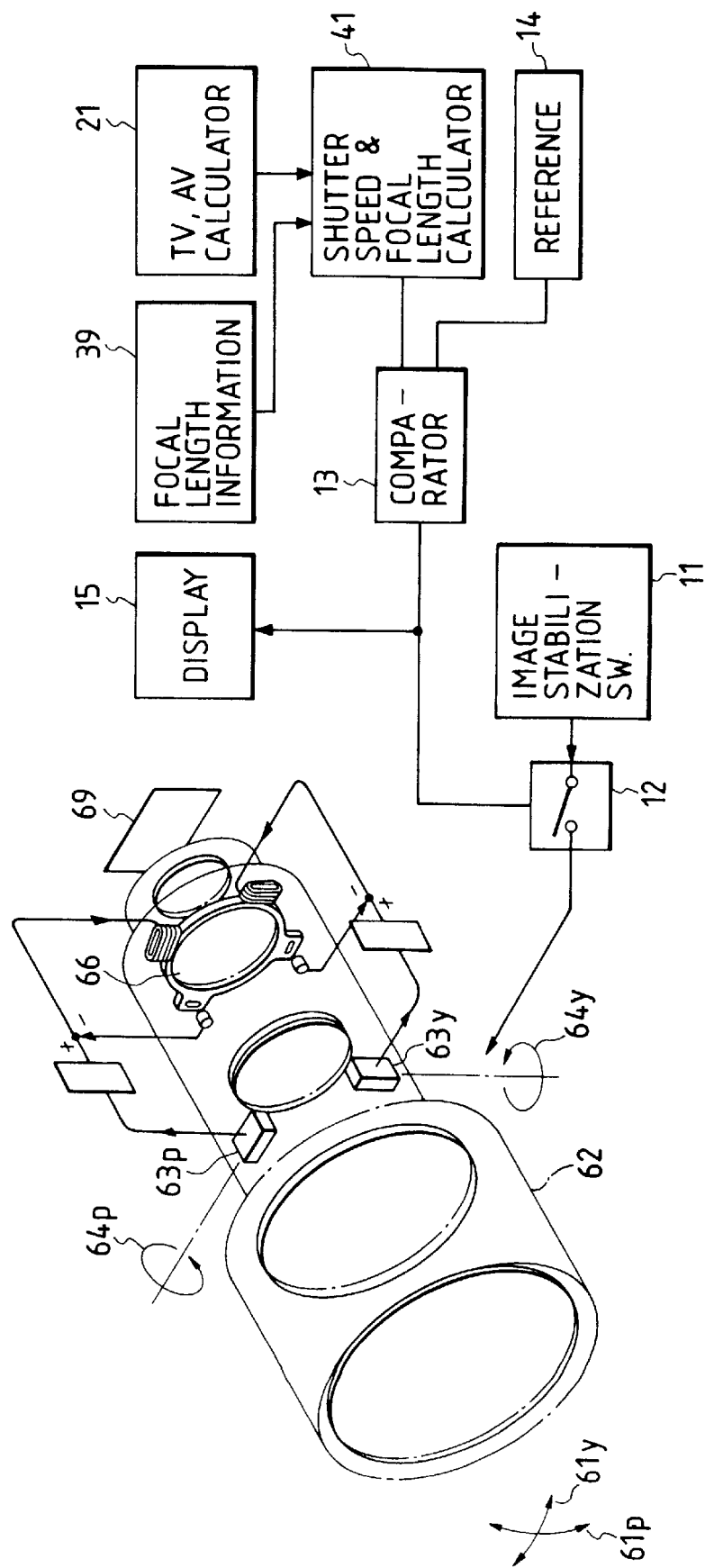
FIG. 4 is a diagram showing an arrangement of a camera with an antivibration faculty according to the fourth embodiment of the present invention.

FIG. 4 is a schematic diagram showing an arrangement of a camera with an antivibration faculty according to the fourth embodiment of the present invention. The same reference numerals in FIG. 4 denote the same parts as in FIGS. 1 to 3.

In this embodiment, a calculation result (an output from a shutter speed & focal length calculator 41) of shutter speed information (an output from a Tv, Av calculator 21) and focal length information (an output from a focal length information output means 31) is compared with an output from a reference means 14 to determine whether or not an antivibration system is enabled.

That is, the influence of a hand vibration is small when a high shutter speed is set even when a long focal length is set, and, contrary to this, the influence is also small when a short focal length is set even when a low shutter speed is set. As a calculation example, the product of a focal length f of a lens and a shutter speed Tv may be calculated, and if the value is equal to or smaller than a predetermined value, the antivibration system may be disabled. For example, when the focal length is "300 mm" and the shutter speed is "1/300", the product is "1". In this case, if the product is equal to or smaller than "1", the antivibration system may be disabled.

In a normal photographing operation, since the focal length is not so long, and the shutter speed is high, the antivibration system need not be enabled. However, in a conventional system, the antivibration system is enabled in such a case to waste the power in the battery. In this embodiment, such a drawback can be eliminated.

As described above, according to each of the embodiments of the present invention, a camera comprises control means for changing a faculty of the antivibration system depending on the states of faculties other than the antivibration system, and blur caution warning means for generating a blur caution warning according to an output from vibration detection means. The control means includes discrimination means for discriminating whether or not a power voltage of the system is lowered by a predetermined value or more, and for, when it is determined that the power voltage is lowered by the predetermined value or more, disabling the antivibration system and driving the blur caution means, and/or another discrimination means for discriminating whether or not a shutter speed is higher than a reference shutter speed, and for, when it is determined that the shutter speed is higher than the reference shutter speed, disabling the antivibration system, and/or still another discrimination means for discriminating whether or not lens focal length information is smaller than reference focal length information, and for, when it is determined that the lens focal length information is smaller than the reference focal length information, disabling the antivibration system. Thus, whether or not the antivibration system is disabled is determined according to the states of faculties other than the antivibration system, i.e., depending on whether or not the power voltage of the camera is lowered by the predetermined value or more, or whether or not the shutter speed is higher than the reference shutter speed, or whether or not the lens focal length information is smaller than the reference focal length information, or on the basis of a combination of information indicating whether or not the shutter speed is higher than the reference shutter speed, and information indicating whether or not the lens focal length information is smaller than the reference focal length information.

Power consumption of the antivibration system itself can be saved, and the influences of the antivibration system on faculties other than the antivibration system can be eliminated.

What is claimed is:

1. An image stabilization apparatus adapted for use with a camera including a release operation portion and a shutter, said apparatus comprising:
   a vibration detection sensor which detects a vibration state of said apparatus;
   an image stabilization device which performs an image stabilizing operation on an image in accordance with an output of said vibration detection sensor; and
   a control device which determines a shutter speed of the shutter and controls operation of said image stabilization device, wherein said control device prevents said image stabilization device from performing the image stabilizing operation when the control device determines that the shutter speed is faster than a predetermined speed.

2. An apparatus according to claim 1, wherein the camera further includes a photographic optical system, and wherein, in response to the predetermined operation of the release operation portion, said control device determines the focal length of the photographic optical system and prevents said image stabilization device from performing the image stabilizing operation when the control device determines that the focal length is shorter than a predetermined length.

3. An apparatus according to claim 1, wherein said control device determines whether or not to operate said image stabilization device on the basis of the shutter speed and the focal length.

4. An apparatus according to claim 3, wherein said control device determines whether or not to operate said image stabilization device on the basis of a product of the shutter speed and the focal length.

5. An apparatus according to claim 1, wherein said vibration detection sensor detects an angular vibration state of the apparatus.

6. An apparatus according to claim 1, wherein said image stabilization device includes a movable member which is movable to perform an image stabilizating operation on the image.

7. An apparatus according to claim 1, wherein said image stabilization device stabilizes the image optically.

8. An apparatus according to claim 7, wherein said image stabilization device includes an optical member which is displaceable in a direction substantially normal to a light axis of the apparatus.

9. An apparatus according to claim 1, wherein said control device causes said image stabilization device to start the image stabilizing operation in response to the predetermined operation of the release operation portion.

10. An apparatus according to claim 1, wherein said control device causes said image stabilization device to start the image stabilizing operation in response to a predetermined operation of the release operation portion for performing a photographic preparation operation.

11. An apparatus according to claim 10, wherein the camera includes a photometry device, and said control device causes said image stabilization device to start the image stabilizing operation in response to a predetermined operation of the release operation portion for performing a photometry operation of the photometry device.

12. An apparatus according to claim 10, wherein the camera includes a photometry device and a calculation circuit which calculates the shutter speed in accordance with a photometry result of the photometry device, and said control device causes said image stabilization device to start the image stabilizing operation in response to a predetermined operation of the release operation portion for causing the calculation circuit to calculate the shutter speed.

13. An apparatus according to claim 1, wherein the release operation portion performs a first stage operation and a successive second stage operation, and wherein said control device causes said image stabilization device to start the image stabilizing operation in response to the first stage operation of the release operation portion.

14. An apparatus according to claim 1, wherein said image stabilization device includes means for performing the image stabilizing operation in accordance with a predetermined operation of the release operation portion, and said control device includes means for causing said image stabilization device not to perform the image stabilizing operation in accordance with a predetermined operation of the release operation portion when said control device determines that the shutter speed is faster than the predetermined speed.

15. A camera comprising:
    a vibration detection sensor which detects a vibration state of said camera;
    an image stabilization device which performs an image stabilizing operation on an image in accordance with an output of said vibration detection sensor;
    a release operation portion;
    a shutter; and
    a control device which controls operation of said image stabilization device wherein, in response to a predetermined operation of the release operation portion, said control device determines the shutter speed of the shutter and prevents said image stabilization device from performing the image stabilizing operation when the control device determines that the shutter speed is faster than a predetermined speed.

16. An image stabilization apparatus adapted for use with a camera including a release operation portion and a photographic optical system, said apparatus comprising:
    a vibration detection sensor which detects a vibration state of said apparatus;
    an image stabilization device which performs an image stabilizing operation on an image in accordance with an output of said vibration detection sensor; and
    a control device which controls operation of said image stabilization device, wherein in response to the predetermined operation of the release operation portion said control device determines the focal length of the photographic optical system and prevents said image stabilization device from performing the image stabilizing operation when the control device determines that the focal length is shorter than a predetermined length.

17. An apparatus according to claim 16, wherein said camera further includes a shutter, and wherein said control device determines the shutter speed of the shutter and prevents said image stabilization device from performing the image stabilizing operation when the shutter speed is faster than a predetermined speed.

18. An apparatus according to claim 17, wherein said control device determines whether or not to operate said image stabilization device on the basis of both the shutter speed and the focal length.

19. An apparatus according to claim 18, wherein said control device determines whether or not to operate said image stabilization device on the basis of a product of the shutter speed and the focal length.

20. An apparatus according to claim 16, wherein said vibration detection sensor detects an angular vibration state of the apparatus.

21. An apparatus according to claim 16, wherein said image stabilization device includes a movable member which is movable to perform an image stabilization operation on the image.

22. An apparatus according to claim 16, wherein said image stabilization device stabilizes the image optically.

23. An apparatus according to claim 22, wherein said image stabilization device includes an optical member which is displaceable in a direction substantially normal to a light axis of the apparatus.

24. An apparatus according to claim 16, wherein said control device causes said image stabilization device to start the image stabilizing operation in response to the predetermined operation of the release operation portion.

25. An apparatus according to claim 16, wherein said control device causes said image stabilization device to start the image stabilizing operation in response to a predetermined operation of the release operation portion for performing a photographic preparation operation.

26. An apparatus according to claim 25, wherein the camera includes a photometry device, and said control device causes said image stabilization device to start the image stabilizing operation in response to a predetermined operation of the release operation portion for performing a photometry operation of the photometry device.

27. An apparatus according to claim 25, wherein the camera includes a photometry device and a calculation circuit which calculates the shutter speed in accordance with a photometry result of the photometry device, and said control device causes said image stabilization device to start the image stabilizing operation in response to a predetermined operation of the release operation portion for causing the calculation circuit to calculate the shutter speed.

28. An apparatus according to claim 16, wherein the release operation portion performs a first stage operation and a successive second stage operation, and wherein said control device causes said image stabilization device to start the image stabilizing operation in response to the first stage operation of the release operation portion.

29. A camera comprising:
a vibration detection sensor which detects a vibration state of said camera;
an image stabilization device which performs an image stabilizing operation on an image in accordance with an output of said vibration detection sensor;
a release operation portion;
a photographic optical system; and
a control device which controls operation of said image stabilization device, wherein in response to a predetermined operation of said release operation portion, said control device determines the focal length of the photographic optical system and prevents said image stabilization device from performing the image stabilizing operation when the control device determines that the focal length is shorter than a predetermined length.

* * * * *

UNITED STATES PATENT AND TRADEMARK OFFICE
CERTIFICATE OF CORRECTION

PATENT NO. : 5,940,630  
DATED : August 17, 1999  
INVENTOR(S) : KOICHI WASHISU

Page 1 of 2

It is certified that error appears in the above-identified patent and that said Letters Patent is hereby corrected as shown below: On the title page:

AT [56] References Cited

U.S. PATENT DOCUMENTS

Insert: "5,181,056 1/19/93 Noguchi et al."

"5,245,278  9/1993  Washisu" should read
--5,245,378  9/1993  Washisu--.

"5,266,981 11/1993   IIamada et al." should read
-- 5,266,981  9/1993 Hamada et al.--

Column 1

Line 35, "1 IIz to 12 IIz." should read --1Hz to 12Hz--.
Line 36, "taking" should read --taking of--.
Line 37, "at" should read --during--.
Line 38, "timing" should be deleted.

Column 4

Line 2, IIowever," should read --However,--.

Column 10

Line 49, "a" should read --the--.

UNITED STATES PATENT AND TRADEMARK OFFICE
CERTIFICATE OF CORRECTION

PATENT NO. : 5,940,630
DATED : August 17, 1999
INVENTOR(S) : KOICHI WASHISU

It is certified that error appears in the above-identified patent and that said Letters Patent is hereby corrected as shown below:

<u>Column 11</u>

Line 2, "warning" should be deleted.
    Line 3, "caution" should read --caution warning--
    Line 4, "caution" should read --caution warning--
    Line 19, "re-establishes" should read
re-establishes his hold on--.
    Line 22, "hand" should read --hand vibration--.
    Line 23, "vibration" should be deleted.

<u>Column 13</u>

Line 32, "claim 1," should read --Claim 2,--.
    Line 45, "stabilizating" should read --stabilizing--.

Signed and Sealed this

Sixteenth Day of May, 2000

Attest:

Q. TODD DICKINSON

Attesting Officer      Director of Patents and Trademarks